United States Patent
Hrusecky et al.

(10) Patent No.: US 7,284,094 B2
(45) Date of Patent: Oct. 16, 2007

(54) MECHANISM AND APPARATUS ALLOWING AN N-WAY SET ASSOCIATIVE CACHE, IMPLEMENTING A HYBRID PSEUDO-LRU REPLACEMENT ALGORITHM, TO HAVE N L1 MISS FETCH REQUESTS SIMULTANEOUSLY INFLIGHT REGARDLESS OF THEIR CONGRUENCE CLASS

(75) Inventors: David Allen Hrusecky, Cedar Park, TX (US); Sheldon B. Levenstein, Austin, TX (US); Bruce Joseph Ronchetti, Austin, TX (US); Anthony Saporito, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/054,293

(22) Filed: Feb. 9, 2005

(65) Prior Publication Data

US 2006/0179227 A1 Aug. 10, 2006

(51) Int. Cl.
*G06F 12/00* (2006.01)
(52) U.S. Cl. ...................................... 711/128

(58) Field of Classification Search ................ 711/128, 711/133, 134, 136
See application file for complete search history.

(56) References Cited

U.S. PATENT DOCUMENTS 5,651,135 A * 7/1997 Hatakeyama ................ 711/128
2005/0055506 A1* 3/2005 DeMent et al. ............. 711/133

* cited by examiner

*Primary Examiner*—Hiep T. Nguyen
(74) *Attorney, Agent, or Firm*—Duke W. Yee; Diana R. Gerhardt; Theodore D. Fay, III

(57) ABSTRACT

A method, system, and computer program product for supporting multiple fetch requests to the same congruence class in an n-way set associative cache. Responsive to receiving an incoming fetch instruction at a load/store unit, outstanding valid fetch entries in the n-way set associative cache that have the same cache congruence class as the incoming fetch instruction are identified. SetIDs in used by these identified outstanding valid fetch entries are determined. A resulting setID is assigned to the incoming fetch instruction based on the identified setIDs, wherein the resulting setID assigned is a setID not currently in use by the outstanding valid fetch entries. The resulting setID for the incoming fetch instruction is written in a corresponding entry in the n-way set associative cache.

18 Claims, 5 Drawing Sheets

| | V | CCC | S0 | S1 | S2 | S3 | S4 | S5 | S6 | S7 | AGE CNTR |
|---|---|---|---|---|---|---|---|---|---|---|---|
| FETCH0: | 1 | 9 | 1 | • | • | • | • | • | • | • | • • • • |
| FETCH1: | 1 | 1 | 1 | • | • | • | • | • | • | • | • • • • |
| FETCH2: | 1 | 9 | • | 1 | • | • | • | • | • | • | • • • • |
| FETCH3: | 1 | 2 | 1 | • | • | • | • | • | • | • | • • • • |
| FETCH4: | 1 | 3 | 1 | • | • | • | • | • | • | • | • • • • |
| FETCH5: | 1 | 9 | • | • | • | 1 | • | • | • | • | • • • • |
| FETCH6: | 1 | 1 | • | • | • | • | • | • | • | 1 | • • • • |
| FETCH7: | 0 | - | - | - | - | - | - | - | - | - | - - - - |

| | V | CCC | S0 | S1 | S2 | S3 | S4 | S5 | S6 | S7 | AGE CNTR |
|---|---|---|---|---|---|---|---|---|---|---|---|
| FETCH0: | 1 | 9 | 1 | • | • | • | • | • | • | • | • • • • |
| FETCH1: | 1 | 1 | 1 | • | • | • | • | • | • | • | • • • • |
| FETCH2: | 1 | 9 | • | 1 | • | • | • | • | • | • | • • • • |
| FETCH3: | 1 | 2 | 1 | • | • | • | • | • | • | • | • • • • |
| FETCH4: | 1 | 3 | 1 | • | • | • | • | • | • | • | • • • • |
| FETCH5: | 1 | 9 | • | • | • | 1 | • | • | • | • | • • • • |
| FETCH6: | 1 | 1 | • | • | • | • | • | • | • | 1 | • • • • |
| FETCH7: | 1 | 9 | • | • | 1 | • | • | • | • | • | • • • • |

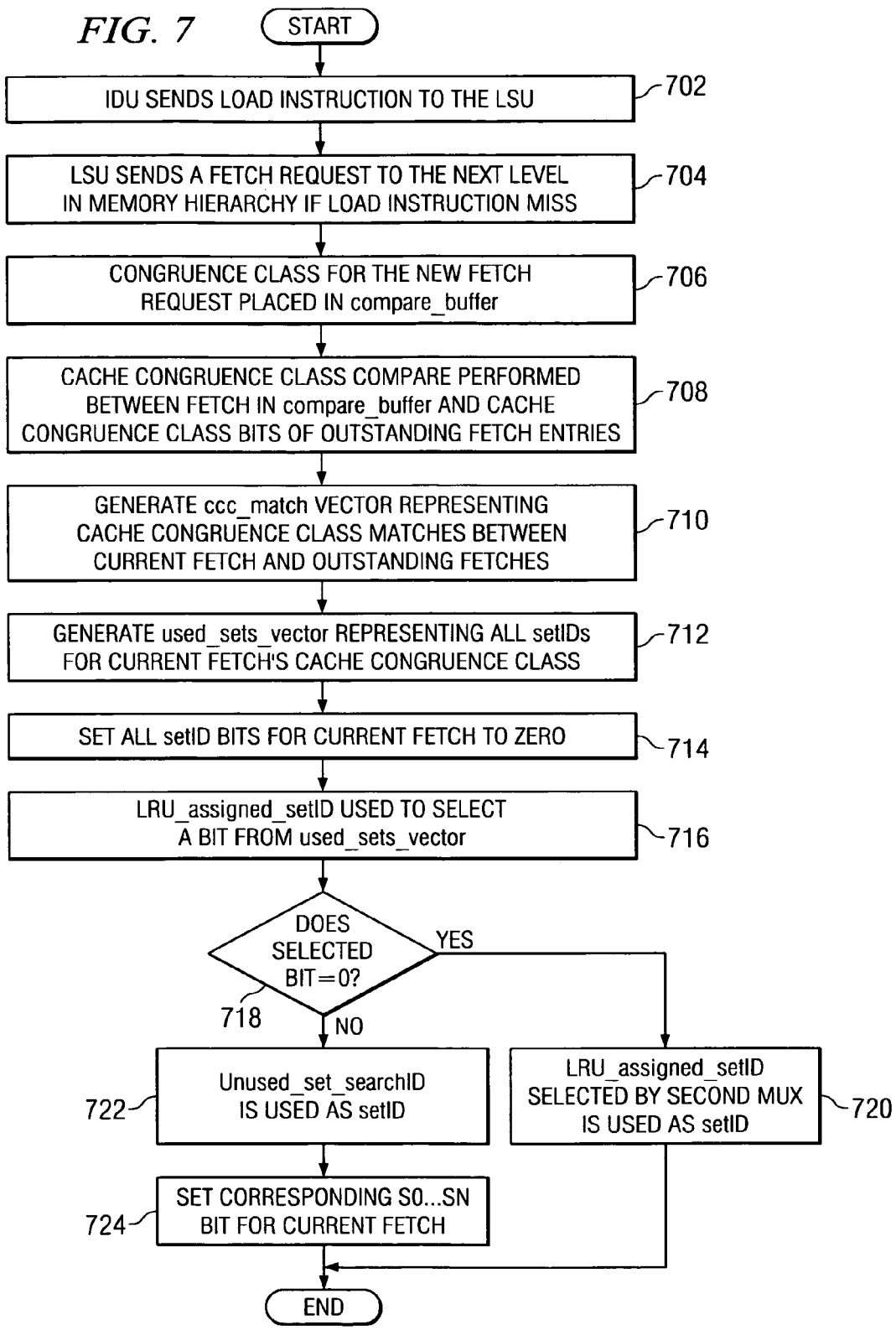

MECHANISM AND APPARATUS ALLOWING AN N-WAY SET ASSOCIATIVE CACHE, IMPLEMENTING A HYBRID PSEUDO-LRU REPLACEMENT ALGORITHM, TO HAVE N L1 MISS FETCH REQUESTS SIMULTANEOUSLY INFLIGHT REGARDLESS OF THEIR CONGRUENCE CLASS

BACKGROUND OF THE INVENTION

1. Technical Field

The present invention relates generally to an improved data processing system, and in particular, to an improved method and apparatus for caching data in a memory. Specifically, the mechanism of the present invention may be used to improve the setID selection of existing and future cache replacement algorithms, such as non-100% accurate least-recently-used heuristics.

2. Description of Related Art

Most early data processing systems consisted basically of a central processing unit, a main memory, and some sort of secondary input/output ("I/O") capability. In these earlier systems, the main memory was the limiting element. Over time, logic circuit speeds increased along with the capacity requirements of main memory. With the need for increasing capacity in the main memory, the speed of the main memory could not keep up with the increasing speed of the CPU. Consequently, a gap developed between the main memory and the processor cycle time, which resulted in un-optimized processing speeds. As a result, a cache memory was developed to bridge the gap between the memory and the processor cycle time.

Using a cache to bridge the performance gap between a processor and main memory has become important in data processing systems of various designs from personal computers to work stations to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

A number of different schemes for organizing a cache memory exist. For example, a fully associative mapping organization may be employed whereby a data address may exist in any location in the cache, or a direct mapping scheme may be employed in a cache memory whereby a data address may exist in only one location in the cache. A set associative scheme may be employed by partitioning the cache into distinct classes of lines, wherein each class contains a small fixed number of lines. This approach is somewhere between a direct mapped and a full associative cache. The classes of lines are usually referred to as "congruence classes." The lines in a congruence class are usually referred to as sets (which indicate the number of locations an address can reside) in a congruence class in a set associative cache. Each set has a setID that is used to identify each slot in a congruence class.

One generally used type of replacement policy is the least-recently-used (LRU) policy. An LRU policy is built upon the premise that the least recently used cache line in a congruence class is the least worthy of being retained. So, when it becomes necessary to evict a cache line to make room for a new one, an LRU policy chooses as a victim a cache line which is the least recently accessed set (or member) within a congruence class.

A most-recently-used-update (MRU-update) operation typically occurs due to a cache hit. It adjusts the LRU state such that the "hit" member is ordered ahead of all other members in that congruence class, establishing the cache line in that member position as the most worthy member in the congruence class.

Several factors complicate the behavior of LRU replacement policies in multi-level cache hierarchies, particularly when those hierarchies contain nth level caches that are shared by multiple structures at level n−1. For example, a processor may contain a first level instruction cache and a first level data cache. These may be backed by a second level cache that includes both instructions and data. Such a structure is designed so that processor requests for cache lines that miss in the first level caches have a high likelihood of being found in the second level cache.

As described earlier, the LRU replacement policy in the first level caches would update as most-recently-used those cache lines that are used most often by the processor. Cache lines that are less important (or worthy) to the processor, since they are used less often, would be less likely to be marked as most-recently-used. Thus, the more frequently used lines tend to remain in the first level cache, while the less frequently used lines tend to be evicted from the first level cache. When making design choices for an LRU replacement algorithm to implement in a system, simple binary tree algorithms are typically favored over more accurate "true-LRU" algorithms. An example of the binary tree algorithm is described in "Cache Line Replacement Selection using a Logical Multi-Way Tree with Access Order States Maintained at Each Node", which can be found on the World Wide Web at priorartdatabase-dot-com/IP-COM/000030586, and is hereby incorporated by reference. In contrast with binary tree algorithms, a true-LRU algorithm accurately tracks the accessing of each individual cache line. In this manner, a true-LRU algorithm tells precisely which line is the least recently used. However, the implementation of a true-LRU algorithm has considerable overhead and is not a very realistic approach for N-way set associative caches when N>5. The number of states needed for a true-LRU implementation is also prohibitive from an area/power standpoint.

In addition to the fact that microprocessors that attain the highest frequencies are implemented with deep pipelines and short pipeline stages, simple binary tree algorithms are preferred for their simplicity of implementation. Thus, the less accurate binary-tree algorithm that allows for a higher overall frequency usually provides the best way to maximize overall machine performance.

Using binary tree algorithms are also desirable because the algorithms do not require knowledge of the current state of the LRU bits when establishing a new LRU or MRU candidate. Consequently, the algorithms can be implemented with the simplest form of array structure—a one port read or write array. The area savings of such a design is beneficial to the overall goal of cost savings (e.g., smaller chip area) and achieving the highest frequencies (e.g., less consumption of critical area on a custom very large-scale integration (VLSI) processor design).

Although the use of the simple array and binary tree LRU replacement algorithms provide many benefits, they also contain several drawbacks. One problem encountered using the simple algorithm is that the quality of the LRU slot ID produced by the algorithm may be poor enough to degrade performance due to poor cache line replacement choices. Another problem is that the simple LRU array described above cannot be updated on the same cycle as a lookup. Updates are performed at a later time when there is an empty cycle, or when a reload writes its data into the L1 cache. This situation creates a window where the same setID will be given to multiple cache miss fetch requests to the same congruence class until the first fetch request returns and updates the LRU. Having the same setID assigned to multiple cache miss fetch requests would allow multiple fetches to write into the exact same location. This situation is undesirable since having data written to the same location would corrupt the cache data by having sections of many cache lines overlaid on top of one another.

Existing methods that have addressed this problem include single and multiple fetch designs. These methods, however, still have negative impacts on system performance. One such method is the single fetch design, which only allows for one outstanding fetch in a particular time period. Another such method is a multiple fetch design, which does not allow for multiple fetching to a particular congruence class, but rather this method just blocks a fetch if another fetch is outstanding to the same congruence class.

Therefore, it would be advantageous to have a mechanism that allows an n-way set associative cache to have n L1 miss fetch requests simultaneously in flight regardless of their congruence class. It would further be advantageous to have a hybrid replacement policy that allows for identifying empty slots of a given congruence class, and, if an empty slot is found, giving the empty slot ID a higher priority than the slot selected by the binary tree algorithm.

SUMMARY OF THE INVENTION

The present invention provides a method, system, and computer program product for supporting multiple fetch requests to the same congruence class in an n-way set associative cache. Responsive to receiving an incoming fetch instruction at a load/store unit, outstanding valid fetch entries in the n-way set associative cache that have the same cache congruence class as the incoming fetch instruction are identified. SetIDs in used by these identified outstanding valid fetch entries are determined. A resulting setID is assigned to the incoming fetch instruction based on the identified setIDs, wherein the resulting setID assigned is a setID not currently in use by the outstanding valid fetch entries. The resulting setID for the incoming fetch instruction is written in a corresponding entry in the n-way set associative cache.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart of a process for allowing an n-way set associative cache to have multiple L1 miss fetch requests to the same congruence class in accordance with a preferred embodiment of the present invention.

DETAILED DESCRIPTION OF THE PREFERRED EMBODIMENT

Figure 1:
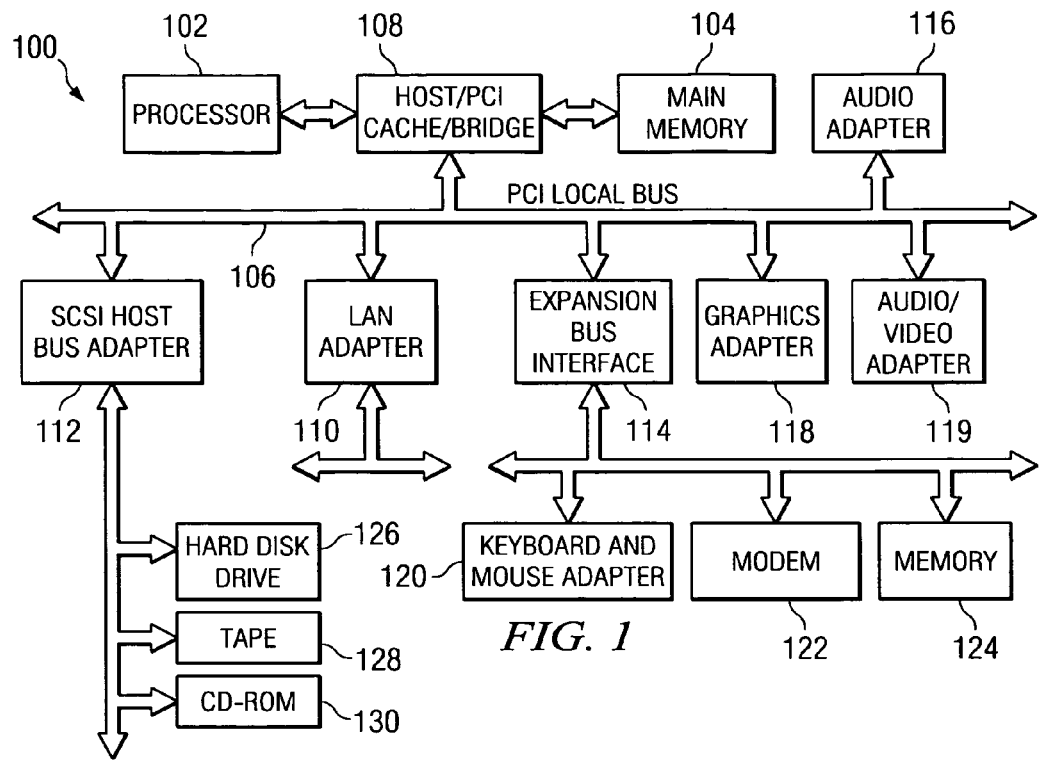
FIG. 1 is an exemplary pictorial representation of a data processing system in which the present invention may be implemented.

With reference now to FIG. 1, an exemplary block diagram of a data processing system is shown in which the present invention may be implemented. Data processing system 100 is an example of a computer, in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
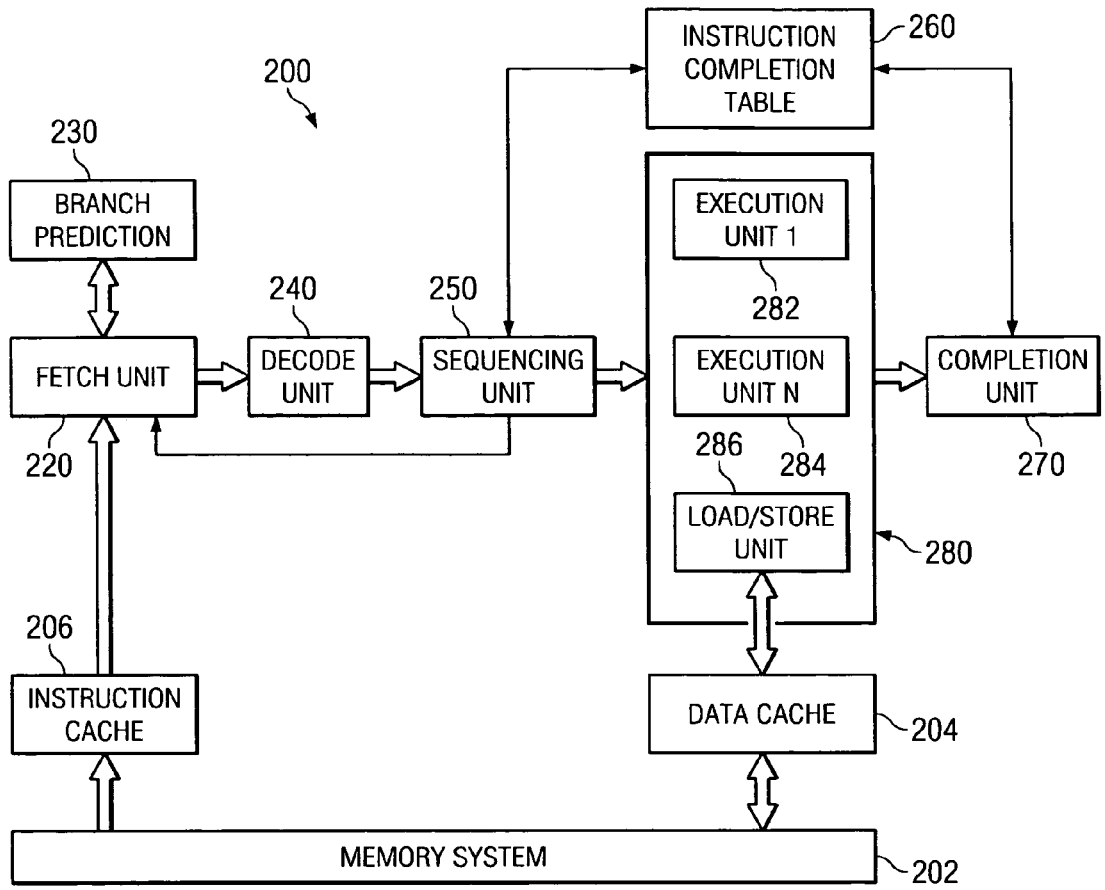
FIG. 2 is an exemplary block diagram of a data processing system in which aspects of the present invention may be implemented.

FIG. 2 is an exemplary block diagram of a speculative execution processor in which aspects of the present invention may be implemented. System 200 shows memory system 202, data cache 204, and instruction cache 206. As instructions are executed, they cause events within the processor, such as cache accesses.

Fetch unit 220 retrieves instructions from instruction cache 206, which in turn retrieves instructions from memory 202. Decode unit 240 decodes instructions to determine basic information about the instruction, such as instruction type, source registers, and destination registers. Sequencing unit 250 uses the decoded information to schedule instructions for execution. In order to track instructions, completion table 260 is used for storing and retrieving information about scheduled instructions. As sequencing unit 250 assigns the dispatched instruction to an associated entry in completion table 260, sequencing unit 250 assigns or associates entries to executing instructions on a first-in, first-out basis or rotating manner. As the instructions are executed, information concerning the executing instructions is stored into various fields and subfields of the associated entry of completion table 260 for the particular instruction.

Instructions executed by execution control unit 280 using one of the execution units 1-N, such as execution unit #1 282 or execution unit #N 284, may use load/store unit 286 to cause data to be read from or written to memory 202 via data cache 204. As instructions complete, completion unit 270 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction specifies a new data location from which to begin fetching instructions. When fetch unit 220 receives a conditional branch operation and the data upon which the condition is based is not yet available (e.g., the instruction that will produce the necessary data has not been executed), fetch unit 220 may use one or more branch prediction mechanisms in branch prediction control unit 230 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions cannot complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 3:
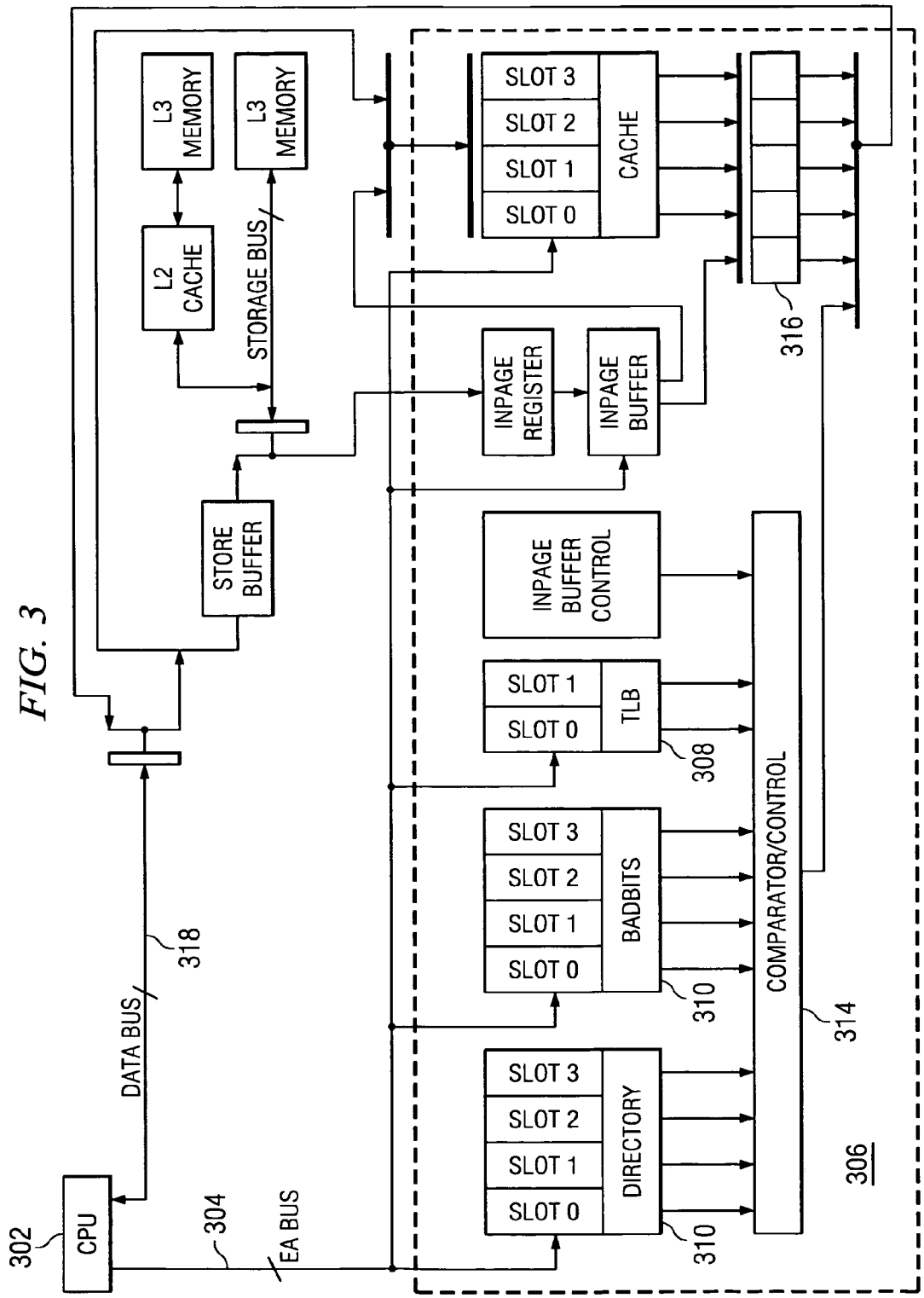
FIG. 3 is an exemplary block diagram depicting data flow associated with the cache in FIG. 2.

FIG. 3 is a block diagram depicting an exemplary data flow associated with the cache in FIG. 2. When processor 302 initiates a fetch operation, the storage address is placed on EA bus 304. In this example, EA bus 304 is 31 bits wide with address bits 1 to 31. As soon as data cache unit 306 receives the address, bits 14 to 19 are used to address translator 308; bits 20 to 25 are used to address the congruence class of directory 310, and bits 20 to 28 are used to address the cache. Bits 29 through 31 identify the byte of the double word of addressed cache line 312. The access of the translator, directory, and cache are all done in parallel. The outputs of the translator are used to compare with the address bits 1 to 13 of EA bus 304 at comparator 314. Translator 308 is designed with two-way associative with 64 pages per associativity class. Each page of translator 308 consists of 4K bytes of data. Whichever output of the two associativity classes has a match with address bits 1 to 13 of the EA bus, then its corresponding absolute address, bits 4-19, is used to compare with the contents (absolute address bits 4-19) in the four slots of the referenced congruence class from directory 310. A slot hit is generated if one of the four sets addresses in the slots of the directory has a match with the absolute address from translator 308. At the same time, all four slots of data (8 bytes per slot) from the cache output are latched up. The data for the matched slot is then selected at 316 to send back to processor 302 through data bus 318. A total of five machine cycles are used to update local storage in processor 302 with the fetch data starting from an instruction decode.

The present invention provides a hybrid replacement policy that allows for identifying empty slots of a given congruence class, and, if an empty slot is found, giving the empty slot ID a higher priority than the slot selected by the binary tree algorithm. The advantages of the hybrid replacement policy may be seen whenever there is an occasion to have to invalidate one of the L1 cache lines. An L1 cache line may be invalidated in several situations, including a microarchitectural decision to have only one copy of a given cache line reside in the cache at a time. In addition, different instruction streams coupled with a translation feature may, by way of effective address to real address mapping differences, require that the same cache line be stored in different cache locations for different instruction lookups. For this case, the copy of the cache line in the wrong spot must be invalidated before it can be stored in the second location. Another example includes atomic updates to storage, which often requires all cached copies to be discarded before the master copy of the location is updated.

Invalidation of an L1 cache line may be initiated by program control, such as an instruction from the CPU that specifically requests that a cache line be invalidated. Whenever there is an occasion to have to invalidate one of the L1 cache lines, the conventional response is for to allow the next reload from the fetch unit to inhibit the recently emptied slot of the cache. There is a reasonable expectation that the next slot in the congruence class to be filled would be the one recently vacated. This scenario would take place if the machine were implemented with a "true LRU" scheme. However, if L1 were designed with a binary tree LRU algorithm, it is quite likely that this will not be the case. In a modern machine with multiple thread support and lookahead execution, it is possible for a subsequent lookup, which occurs after an invalidate to the same congruence class, to change the LRU instruction such that the empty slot is no longer least recently used.

In response, the present invention merges knowledge of the "empty slot" for a particular cache congruence class with the production of a simply derived binary tree LRU. With the present invention, the empty slot may be determined separately from the LRU mechanism by means of inspecting the output of the directory during an L1 reference. A typical directory will make invalid entries (empty). If an invalid entry is found, then this slot ID is given higher priority than the one determined by the simply derived binary tree LRU. If no such empty slot exists, the choice determined by the simply derived binary tree LRU is given priority.

In a multi-threaded L1 implementation, neither of these two choices may be the one used for replacement. These cases arise when the cache congruence class slot is neither empty or considered to be LRU, but may be required to be overlaid with a new cache line under the control of a directory management mechanism. These management actions may be required to change the availability of a particular cache line from one thread to the other (or both), and take priority over the previous two choices.

In addition to the above statically determined choice for the set ID to be used as the replacement, the present invention also provides a dynamic Set ID determination in the case for multiple outstanding requests for fetches to the same congruence class. As previously mentioned, the present invention provides a mechanism for allowing an n-way set associative cache to have multiple L1 miss fetch requests at once to the same congruence class. The present invention provides an advantage over existing systems that provide single or multiple fetch designs, as conventional systems that use single fetching only allow for one fetch outstanding in a particular time period, and conventional systems that use multiple fetching do not allow for multiple fetching to a particular congruence class, but rather just block a fetch if another fetch is outstanding to the same congruence class. With the mechanism of the present invention, multiple fetch requests to the same congruence class are supported by forcing each request to use a unique setID to prevent writing to the same location and corrupting the data residing there.

Figure 4:
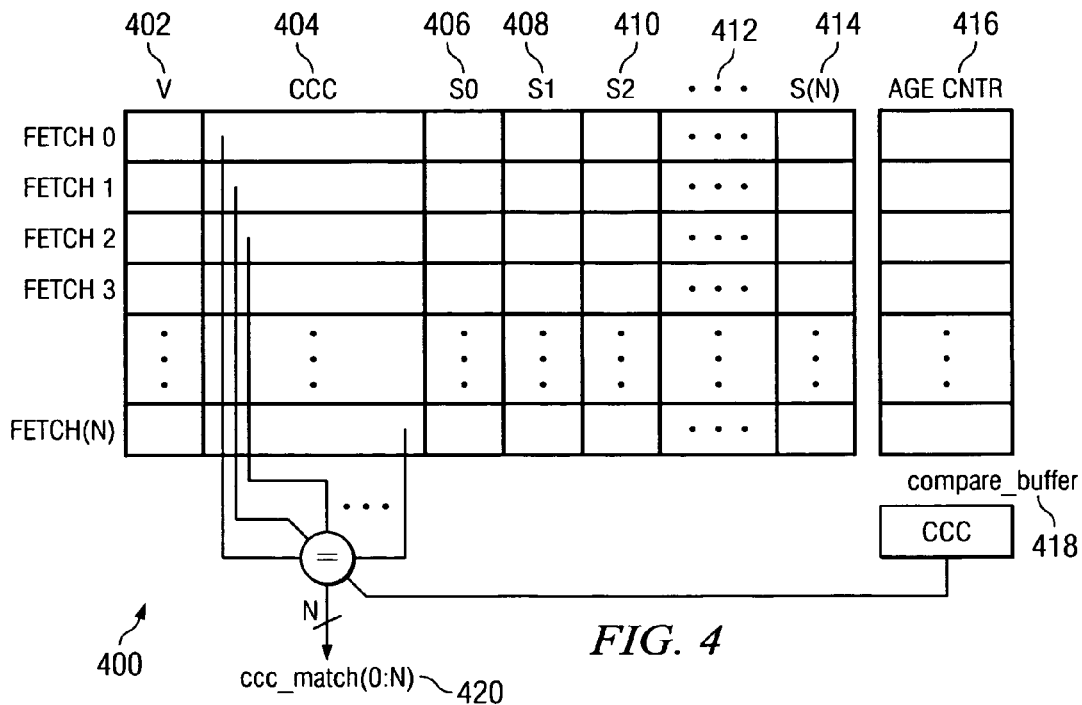
FIG. 4 is an exemplary diagram depicting fetch tracking logic in accordance with a preferred embodiment of the present invention.

Turning now to FIG. 4, an exemplary diagram depicting fetch tracking logic in accordance with a preferred embodiment of the present invention is shown. In one embodiment, fetch tracking logic 400 may be implemented within load/store unit 286 in FIG. 2 near the fetching logic to prevent adding critical paths to the design due to this logic being located elsewhere. However, depending upon the implementation, fetch tracking logic may be physically located anywhere within system 200.

Fetch tracking logic 400 is used in the working algorithm to determine if there are outstanding fetches to the same congruence class that are attempting to use the same setID in that class. This determination is made to prevent writing to the same location and corrupting the data residing there by ensuring that each request has a unique setID. If the fetch tracking logic determines that there are fetches trying to use the same setID, the fetch tracking logic changes the setID in one or more of the fetch requests to remove the conflict.

As shown in FIG. 4, there is a set of registers for all outstanding fetches. Each register comprises valid bit (v) 402, cache congruence class (ccc) 404, various set bits (s0 . . . sN) 406-414, and age counter 416. Valid bit 402 is a single valid bit set at allocation time. Fetch tracking logic 400 resets valid bit 402 when the fetch completes. Cache congruence class 404 is a subset of the cache line address. s0 406 comprises bits that indicates that the fetch will reload into set0 in the cache congruence class specified by ccc 404. Likewise, s1 408 through sN 414 indicate that the fetch will reload into their respective sets in the class specified by ccc 404. Age counter 416 keeps track of the cycle each fetch is in. This tracking is important for high frequency pipelined designs where the function performed must be broken up across many cycles. Age counter 416 allows the proper sequencing of these events for each entry.

When fetch tracking logic 400 determines that a fetch must be made, valid bit 402 of the fetch is written high. Fetch tracking logic 400 writes the congruence class the fetch must load into (based on the cache line address) into ccc 404. In addition, age counter 416 for the entry is started. It should be noted that at this point, the setIDs for s0 . . . sN are all written to zero.

At a later point in time (depending upon the implementation, a later point in the same cycle or in a different cycle), the LRU assigned setID becomes available. The LRU logic provides a setID by first performing a lookup and then identifying the setID the logic thinks should be replaced. Fetch tracking logic 400 inserts the fetch ready to have its setID assigned into compare buffer 418. Compare buffer 418 is used to reduce the number of compares that must be performed. Rather than comparing each entry in the registers against each other, compare buffer 418 holds the congruence class of the current fetch and compares every entry in the registers against the current fetch in the buffer to determine which outstanding fetches have the same congruence class as the current fetch. In other words, compare buffer 418 filters out those outstanding fetches that will not affect the current fetch (i.e., fetches that do not have the same congruence class).

Once the compare has been performed, fetch tracking logic 400 generates a resulting vector of the compare. The resulting vector, such as ccc_match(0:N) 420, indicates which register entries have the same cache congruence class as the fetch in the compare buffer. The resulting vector comprises a bit per fetch that indicates congruence class matches between the fetch and the register entries.

Figure 5:
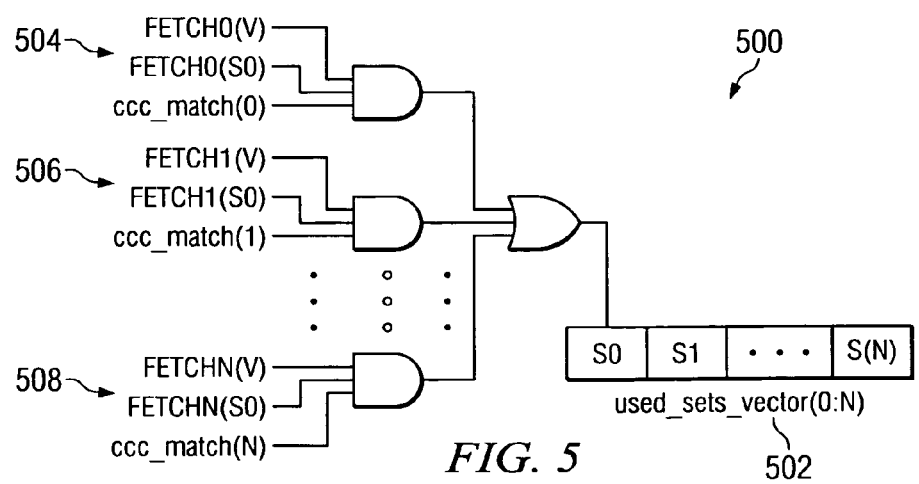
FIG. 5 is an exemplary diagram depicting used setID logic in accordance with a preferred embodiment of the present invention.

Next, an exemplary diagram depicting used setID logic in accordance with a preferred embodiment of the present invention is shown in FIG. 5. Used setID logic 500 shown in FIG. 5 is used to create a vector that represents the setIDs for the cache congruence class of the current fetch in the compare buffer. The resulting vector, such as used_sets_vector(0:N) 502, comprises bits containing setIDs for the class of the current fetch. N number of outstanding fetches, such as fetch0 504, fetch1 506, and fetchN 508, are used to derive used_sets_vector(0:N) 502. The outstanding fetches used to derive the vector are those fetches that were determined to be in the same congruence class as the current fetch in compare buffer 418, as described in FIG. 4.

If a bit in the vector is set to one, this means that a valid fetch to the same congruence class is to be reloaded into that particular set. It should be noted that, for simplicity, only the logic for bit/set0 is shown in FIG. 4. Any fetch entry may set a bit in the vector if the fetch entry is valid, if the ccc_match vector indicates that the fetch is to the same congruence class as the current fetch in the compare buffer, and if the fetch has already been assigned the set that corresponds to the vector bit in question.

When the vector (e.g., used_sets_vector 502) representing the setIDs for the cache congruence class of the current fetch in the compare buffer has been created, the fetch tracking logic performs a search against the vector. The fetch tracking logic also selects a free set in case the LRU assigned setID is already in use. This free set may be determined by performing a left to right search on the used_sets_vector to find the first setID bit equal to 0 (not used). This free set is referred to as the "unused set search ID".

Figures 6, 8A, 8B:
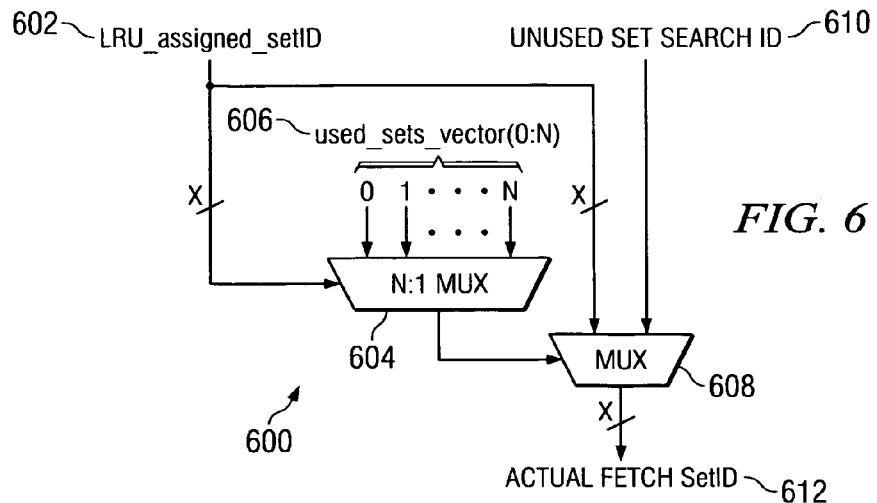
FIG. 6 is an exemplary diagram depicting lookup change logic in accordance with a preferred embodiment of the present invention.
FIGS. 8A and 8B are exemplary diagrams illustrating contents of a set associative cache in accordance with a preferred embodiment of the present invention.

Turning next to FIG. 6, an exemplary diagram depicting lookup change logic sequence in accordance with a preferred embodiment of the present invention is shown. Lookup change logic 600 is used to derive the actual setID for the current fetch in the compare buffer. Prior to the completion of the lookup change sequence in FIG. 6, all of the setID bits for the fetch in the compare buffer are set to zero. Once the lookup change sequence is performed, the fetch in the compare buffer will write its assigned setID. Thus, only older fetches that have already gone through lookup and change logic 600 may participate in the current lookup and change sequence.

LRU_assigned_setID 602 is used as mux selector 604 to select a bit from used_sets_vector 606. A zero bit in used_sets_vector 606 indicates that no other outstanding fetch requests are reloading into the same slot. A one bit indicates that an older fetch to the same congruence class is already using the LRU assigned setID. Thus, if a set bit is set to zero, the logic will allow second mux 608 to choose the LRU assigned set. In contrast, if the set bit is set to one, the logic will use unused set search ID 610 of the free set identified above. The output of the mux is the setID identified for use for the current fetch in the compare buffer, or actual fetch setID 612. The resulting setID will set the corresponding s0 . . . sN bit for the current fetch.

In the examples above, a single scalar implementation is shown for simplicity. This single scalar design easily scales to super scalar designs when more than one load can be issued and executed in a single cycle. In these super scalar designs, more than one fetch may be allowed in a given cycle. The design may be modified in this case to have more than one compare buffer in order to facilitate the maximum number of loads that can be issued per cycle. The multiple compare buffers may also be compared against each other. If entries in the buffers match, then the LRU assigned setID for each concurrent fetch may be compared against all other outstanding fetches. However, care should be taken in the unused setID search so that each concurrent fetch obtains its own distinct setID when changing is necessary.

FIG. 7 is a flowchart of an exemplary process for allowing an n-way set associative cache to have multiple L1 miss fetch requests to the same congruence class in accordance with a preferred embodiment of the present invention. The process described in FIG. 7 may be implemented in a processor system, such as processor system 200 in FIG. 2.

The particular example described in FIG. 7 makes several assumptions, including an 8-way set associative cache design that allows eight outstanding fetch requests at any given time, and a single scalar design having only one new fetch request per cycle. Another assumption made in this simplified example process is that there is enough time in one cycle for all of the functions described below to fit, thus making the age counters unnecessary. In a design where the age counters are necessary, the counters will simply increment in a way that a given value corresponds directly to a fixed cycle for that instruction.

At the start point in this example, assume that there are seven fetch requests already outstanding (inflight), wherein the fetch requests occupy fetch slots 0 to 6. The contents of the set associative cache are shown in FIG. 8A.

First, at a later point in time, a load instruction is dispatched from the dispatch unit to the LSU (step 702). If this load instruction misses in the L1 cache, the LSU sends a fetch request (fetch slot 7) is sent out to the next level in the memory hierarchy (step 704). The cache line referenced by this load instruction (based on the cache line address) must also reside in congruence class 9. The congruence class for the new fetch request will be placed in the compare_buffer (step 706). The cache congruence class of the new fetch will be 9.

Next, a cache congruence class compare is performed between the fetch in the compare_buffer and the cache congruence class bits of each outstanding fetch entry (step 708). This comparison yields a ccc_match vector (step 710). For instance, in this example, the ccc_match_vector is "10100100". This vector 10100100 shows that the congruence class of fetch0, fetch2, and fetch5 match the congruence class of the incoming fetch (fetch7), and that the setID of the incoming fetch cannot match the setID assigned to any of these entries (if the fetch entries are valid).

Secondly, once a ccc_match vector is created, another vector is created that represents the setIDs for the cache congruence class of the current fetch in the compare buffer (step 712). This used_sets_vector comprises bits containing setIDs for the class of the current fetch. The contents of the used_sets_vector is one bit for each setID (8 bits in this example), wherein a given bit in the used_sets_vector be high only when a valid older fetch request to the same congruence class is assigned to reload its data into that same setID. For instance, the value of the used_sets_vector(0:7) is "11010000", meaning that for congruence class 9, sets 0,1, and 3 are already in use by older fetch requests.

The logic then determines what setID should be used for the current fetch (i.e., what setID the reload should write its data into). All of the setID bits for the fetch in the compare buffer are first set to zero (step 714). The LRU_assigned_setID derived from the LRU logic is used as a mux selector to select a bit from the used_sets_vector (step 716). A determination is made as to whether the selected bit is zero or one (step 718). If the set bit is zero (i.e., no other outstanding fetch requests are reloading into the same slot), the logic allows a second mux to select the LRU assigned setID (step 720). The second mux is controlled by a bit that indicates if "LRU assigned set is already in use". If this bit is zero, then the LRU assigned ID will pass through the second mux.

If the set bit is one (i.e., an older fetch to the same congruence class is already using the LRU assigned setID), the logic will then use the free set (unused_set_searchID) chosen by the search logic will pass through the mux (step 722). The unused_set_searchID may be created by performing a left to right search on the used_sets_vector to find a bit equal to 0. The resulting setID then sets the corresponding s0 . . . sN bit for the current fetch (step 724).

For example, assume that the LRU logic, due to the inaccuracy resulting from using a non-true LRU implementation, indicates that this reload should write its data into LRU_assigned_setID "setID3". The N:1 mux depicted in FIG. 3 becomes an 8:1 mux in this example, wherein the LRU_assigned_setID acts as a mux select to choose one of the eight bits in the used_sets_vector(0:7) (step 716). Since the LRU assigned setID is 3, bit 3 of used_sets_vector(0:7) will propagate through the 8:1 mux. This essentially means that the set is already in use, and the logic should pick the unused_set_searchID path into the 2:1 mux shown in FIG. 3 rather than the LRU_assigned_setID path. In this example, this search would produce a pointer to setID2, as setID2 is the first unused setID from left to right.

At the end of this operation, the final results are written back into fetch entry 7, making the final contents of the set associative cache as shown in FIG. 8B. FIG. 8B illustrates that there are now four outstanding fetch requests to congruence class 9 safely using distinct setID values, even though the binary replacement algorithm suggested overlapping setIDs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for dynamically determining setIDs in an n-way set associative cache to allow for multiple fetch requests to a same cache congruence class to improve setID selection of cache replacement algorithms, the method comprising:

responsive to receiving an incoming fetch instruction at a load/store unit, performing a cache congruence lookup to identify outstanding valid fetch entries in the n-way set associative cache having the same cache congruence class as the incoming fetch instruction;

identifying setIDs in use by the identified outstanding valid fetch entries;

assigning a resulting setID to the incoming fetch instruction based on the identified setIDs, wherein the resulting setID assigned is a setID not currently in use by the outstanding valid fetch entries; and writing the resulting setID for the incoming fetch instruction in a corresponding entry in the n-way set associative cache.

2. The method of claim 1, wherein the identifying outstanding valid fetch entries step is performed if the load/store unit sends a fetch request to a next level in a memory hierarchy responsive to the incoming fetch instruction miss in an L1 cache.

3. The method of claim 1, wherein the identifying outstanding valid fetch entries step includes:

placing a congruence class for the incoming fetch instruction into at least one compare buffer;

performing a comparison between the incoming fetch instruction in at least one compare buffer and cache congruence class bits of each outstanding valid fetch entry; and creating a cache congruence class match vector comprising bits indicating which outstanding valid fetch entries have the same cache congruence class as the incoming fetch instruction.

4. The method of claim 3, wherein the comparison is performed by comparing one buffer in the at least one compare buffer against a second buffer in the at least one compare buffer.

5. The method of claim 1, wherein the identifying setID step comprises:

based on the cache congruence class match vector, creating a used sets vector comprising bits representing setIDs used by outstanding valid fetch entries in the same cache congruence class as the incoming fetch instruction.

6. The method of claim 5, wherein contents of the used sets vector includes one bit for each setID.

7. The method of claim 6, wherein a bit in the used sets vector is set valid only when a valid older fetch request to the same congruence class is assigned to reload its data into a same setID.

8. The method of claim 1, wherein the assigning step comprises:

generating a least recently used assigned setID, wherein the least recently used assigned setID is generated from a least recently used algorithm;

using the least recently used assigned setID to select a bit in a used sets vector;

determining whether the selected bit is zero or one;

assigning the least recently used assigned setID as the resulting setID if the selected bit is zero; and assigning an unused setID as the resulting setID if the selected bit is one.

9. The method of claim 8, wherein the unused setID is derived from searching a used sets vector to locate an empty set.

10. A system for dynamically determining setIDs in an n-way set associative cache to allow for multiple fetch requests to a same cache congruence class to improve setID selection of cache replacement algorithms, comprising:

a bus system;

a communications unit connected to the bus, wherein data is sent and received using the communications unit;

a load/store unit connected to the bus system, wherein sets of fetch instructions are located in the load/store unit, and wherein the load/store unit comprises logic for performing a cache congruence lookup to identify outstanding valid fetch entries in the n-way set associative cache having the same cache congruence class as an incoming fetch instruction, for identifying setIDs in use by the identified outstanding valid fetch entries, for assigning a resulting setID to the incoming fetch instruction based on the identified setIDs, wherein the resulting setID assigned is a setID not currently in use by the outstanding valid fetch entries, and for writing the resulting setID for the incoming fetch instruction in a corresponding entry in the n-way set associative cache.

11. The system of claim 10, wherein the outstanding valid fetch entries are identified if the load/store unit sends a fetch request to a next level in a memory hierarchy responsive to the incoming fetch instruction miss in an L1 cache.

12. The system of claim 10, wherein the load/store unit identifies outstanding valid fetch entries by placing a congruence class for the incoming fetch instruction into at least one compare buffer, performing a comparison between the incoming fetch instruction in at least one compare buffer and cache congruence class bits of each outstanding valid fetch entry, and creating a cache congruence class match vector comprising bits indicating which outstanding valid fetch entries have the same cache congruence class as the incoming fetch instruction.

13. The system of claim 12, wherein the comparison is performed by comparing one buffer in the at least one compare buffer against a second buffer in the at least one compare buffer.

14. The system of claim 10, wherein the load/store unit identifies the setID by creating a used sets vector based on the cache congruence class match vector, wherein the used sets vector comprises bits representing setIDs used by outstanding valid fetch entries in the same cache congruence class as the incoming fetch instruction.

15. The system of claim 14, wherein contents of the used sets vector includes one bit for each setID.

16. The system of claim 15, wherein a bit in the used sets vector is set valid only when a valid older fetch request to the same congruence class is assigned to reload its data into a same setID.

17. The system of claim 10, wherein the load/store unit assigns a resulting setID by generating a least recently used assigned setID, wherein the least recently used assigned setID is generated from a least recently used algorithm, using the least recently used assigned setID to select a bit in a used sets vector, determining whether the selected bit is zero or one, assigning the least recently used assigned setID as the resulting setID if the selected bit is zero, and overriding the least recently used assigned setID by assigning an empty setID as the resulting setID if the selected bit is one.

18. The system of claim 17, wherein the empty setID is derived from searching a used sets vector to locate a set not in use.

* * * * *